United States Patent
Zhong (10) Patent No.: US 11,438,962 B2
(45) Date of Patent: Sep. 6, 2022

(54) METHOD AND APPARATUS FOR ESTABLISHING SINGLE-LINE CONNECTION, AND WIRELESS HEADSET AND CHARGING BOX

(71) Applicant: GOERTEK TECHNOLOGY CO., LTD., Qingdao (CN)

(72) Inventor: Qi Zhong, Qingdao (CN)

(73) Assignee: GOERTEK TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 16/972,301

(22) PCT Filed: Jul. 27, 2018

(86) PCT No.: PCT/CN2018/097399
§ 371 (c)(1),
(2) Date: Dec. 4, 2020

(87) PCT Pub. No.: WO2019/237464
PCT Pub. Date: Dec. 19, 2019

(65) Prior Publication Data
US 2021/0160955 A1 May 27, 2021

(30) Foreign Application Priority Data
Jun. 12, 2018 (CN) .......................... 201810600210.2

(51) Int. Cl.
*H04W 76/40* (2018.01)
*H04W 4/80* (2018.01)
(Continued)

(52) U.S. Cl.
CPC ......... *H04W 76/40* (2018.02); *H02J 7/00032* (2020.01); *H02J 7/0045* (2013.01);
(Continued)

(58) Field of Classification Search
CPC ....................................................... H04W 4/80
See application file for complete search history.

(56) References Cited

U.S. PATENT DOCUMENTS

| 2007/0169105 A1* | 7/2007 | Amberny | ........ | H04M 1/72406 |
| | | | | 717/170 |
| 2009/0199025 A1* | 8/2009 | Sherman | ........ | H04M 15/00 |
| | | | | 713/310 |

(Continued)

FOREIGN PATENT DOCUMENTS

| CN | 104269709 A | 1/2015 |
| CN | 104348230 A | 2/2015 |

(Continued)

OTHER PUBLICATIONS

China Patent Office, International Search Repod, English Translation, for PCT/CN2018/097399 filed Jul. 27, 2018, dated Feb. 21, 2019.

*Primary Examiner* — Wen W Huang
(74) *Attorney, Agent, or Firm* — Workman Nydegger (57) ABSTRACT

Provided is a method for establishing a single-line connection. A wireless earphone determines whether a power supply contact of a charging box is in a communication mode, where a charging contact of the wireless earphone is connected to the power supply contact of the charging box. The wireless earphone switches the charging contact from a charging mode to a communication mode to establish a single-line connection with the charging box when determining that the power supply contact of the charging box is in the communication mode.

16 Claims, 3 Drawing Sheets

(51) Int. Cl.
*H02J 7/00* (2006.01)
*H04R 1/10* (2006.01)
(52) U.S. Cl.
CPC ......... *H04R 1/1025* (2013.01); *H04R 1/1041* (2013.01); *H04W 4/80* (2018.02); *H04R 2420/07* (2013.01)

(56) References Cited

U.S. PATENT DOCUMENTS

| | | | |
|---|---|---|---|
| 2015/0194830 A1* | 7/2015 | Lei | H02J 7/00308 320/160 |
| 2015/0207353 A1* | 7/2015 | Oku | H02J 7/007182 320/107 |
| 2016/0006292 A1* | 1/2016 | Hatanaka | H02J 50/12 320/108 |
| 2016/0099604 A1* | 4/2016 | Von Novak, III | H02J 5/005 320/108 |
| 2017/0245039 A1* | 8/2017 | Chen | H01M 10/36 |
| 2018/0062409 A1* | 3/2018 | Jung | H02J 7/0071 |
| 2018/0091887 A1* | 3/2018 | Minoo | H04R 1/1025 |

FOREIGN PATENT DOCUMENTS

| | | |
|---|---|---|
| CN | 106453964 A | 2/2017 |
| CN | 106787232 A | 5/2017 |
| CN | 107708014 A | 2/2018 |
| CN | 107809696 A | 3/2018 |
| CN | 107885478 A | 4/2018 |
| CN | 107887950 A | 4/2018 |

\* cited by examiner

મેthod AND APPARATUS FOR ESTABLISHING SINGLE-LINE CONNECTION, AND WIRELESS HEADSET AND CHARGING BOX The present application is a national phase application of PCT international patent application PCT/CN2018/097399, filed on Jul. 27, 2018 which claims priority to Chinese Patent Application No. 201810600210.2, titled "METHOD AND APPARATUS FOR ESTABLISHING SINGLE-LINE CONNECTION, AND WIRELESS HEADSET AND CHARGING BOX", filed on Jun. 12, 2018 with the China National Intellectual Property Administration, both of which are incorporated herein by reference in their entireties.

FIELD

The present disclosure relates to the technical field of portable listening device, and in particular to a method and an apparatus for establishing a single-line connection, a wireless earphone, a TWS headset, and a charging box.

BACKGROUND

A headset is a pair of conversion units, and is used to receive electrical signals from a media player or a receiver and convert the received electrical signals into audible sound waves by using speakers close to ears.

At present, the headset includes a wired headset and a wireless headset. For the wired headset, a left earphone is connected to a right earphone by a wire to form a left sound channel and a right sound channel, to realize a stereo effect. The wired headset is relatively inconvenient to wear. The wireless headset communicates with a terminal through a wireless communication protocol (for example, Bluetooth). Compared with the wired headset, the wireless headset does not require a data cable and is convenient to use. A latest true wireless stereo headset (TWS headset) is a typical one of wireless headsets. Further, a wireless headset such as the TWS headset generally requires a charging box for storing and charging.

In the conventional technology, in addition to charging a wireless headset such as the TWS headset, the charging box also has functions such as sending a paring command, and thus information interaction between the charging box and the wireless headset is required. The existing Bluetooth Low Energy (BLE) information interaction method results in conflicts of broadcasting and scanning between devices, hence a device cannot receive information from another device in time. Therefore, an urgent problem required to be solved currently is how to establish reliable communication between the charging box and the wireless headset, so as to avoid the conflicts of broadcasting and scanning between the devices in the BLE communication, thereby enhancing user experience.

SUMMARY

A method and an apparatus for establishing a single-line connection, a wireless earphone, a TWS headset, and a charging box are provided according to the present disclosure, to establish a single-line connection between a wireless earphone and a charging box, so as to improve reliability of communication between the charging box and the wireless earphone, thereby enhancing user experience.

To solve the above technical problems, a method for establishing a single-line connection is provided according to the present disclosure. The method for establishing a single-line connection includes: determining, by a wireless earphone, whether a power supply contact of a charging box is in a communication mode, where a charging contact of the wireless earphone is connected to the power supply contact of the charging box; and switching the charging contact from a charging mode to a communication mode to establish a single-line connection with the charging box when determining that the power supply contact of the charging box is in the communication mode.

Optionally, the determining, by a wireless earphone, whether a power supply contact of a charging box is in a communication mode includes: determining, by the wireless earphone, whether a voltage of the charging contact is within a preset range; and performing the step of switching the charging contact from a charging mode to a communication mode to establish a single-line connection with the charging box, when determining that the voltage of the charging box is within the preset range.

Optionally, before the switching the charging contact from a charging mode to a communication mode to establish a single-line connection with the charging box, the method for establishing a single-line connection further includes: starting BLE scanning, and receiving command information sent by the charging box through BLE broadcasting, where the command information includes request data information and data information.

Optionally, after the switching the charging contact from a charging mode to a communication mode to establish a single-line connection with the charging box, the method for establishing a single-line connection further includes: sending single-line connection disconnection information to the charging box via the charging contact in a case that the command information is the data information; and switching the charging contact to the charging mode after sending the single-line connection disconnection information.

Optionally, after the switching the charging contact from a charging mode to a communication mode to establish a single-line connection with the charging box, the method for establishing a single-line connection further includes: sending a BLE scanning command and a single-line connection disconnection command to the charging box via the charging contact and sending data corresponding to the request data information to the charging box through BLE broadcasting, in a case that the command information is the request data information; and switching the charging contact to the charging mode after sending the BLE scanning command and the single-line connection disconnection command.

Optionally, after the switching the charging contact from a charging mode to a communication mode to establish a single-line connection with the charging box, the method for establishing a single-line connection further includes: sending status information to the charging box via the charging contact, where the status information includes power information and pairing information of the wireless earphone; and switching the charging contact to the charging mode after sending the status information.

Optionally, the switching the charging contact to the charging mode after sending the status information includes: sending the single-line connection disconnection command to the charging box via the charging contact after sending the status information; and switching the charging contact to the charging mode after sending the single-line connection disconnection command.

An apparatus for establishing a single-line connection is further provided according to the present disclosure. The apparatus for establishing a single-line connection includes a determining module and a switching module. The determining module is configured to determine whether a power supply contact of a charging box is in a communication mode. A charging contact of a wireless earphone is connected to the power supply contact of the charging box. The switching module is configured to switch the charging contact from a charging mode to a communication mode to establish a single-line connection with the charging box, in a case that the power supply contact of the charging box is determined as in the communication mode.

A wireless earphone is further provided according to the present disclosure. The wireless earphone includes a charging contact, a communication interface, a memory and a processor. The memory is configured to store a computer program. The processor is configured to execute the computer program to perform the method for establishing a single-line connection according to any one of the above.

A TWS headset is further provided according to the present disclosure. The TWS headset includes a first wireless earphone and a second wireless earphone. Each of the first wireless earphone and the second wireless earphone is the wireless earphone described above.

A method for establishing a single-line connection is further provided according to the present disclosure. The method for establishing a single-line connection includes: determining, by a charging box, whether to establish a single-line connection with a wireless earphone, where a power supply contact of the charging box is connected to a charging contact of the wireless earphone; and switching the power supply contact from a charging mode to a communication mode when determining to establish a single-line connection with the wireless earphone.

Optionally, the determining, by a charging box, whether to establish a single-line connection with a wireless earphone includes: determining, by the charging box, whether to send command information to the wireless earphone, where the command information includes request data information and data information; and performing the step of switching the power supply contact from a charging mode to a communication mode when determining to send command information to the wireless earphone.

Optionally, after the switching the power supply contact from a charging mode to a communication mode, the method for establishing a single-line connection further includes: sending the command information to the wireless earphone through BLE broadcasting.

Optionally, after the switching the power supply contact from a charging mode to a communication mode, the method for establishing a single-line connection further includes: receiving status information sent by the wireless earphone via the power supply contact, where the status information includes power information and pairing information of the wireless earphone.

Optionally, after the receiving status information sent by the wireless earphone, the method for establishing a single-line connection further includes: determining whether a cover of the charging box is closed; and switching the power supply contact to a charging mode when determining that the cover of the charging box is closed.

An apparatus for single-line connection is further provided according to the present disclosure. The apparatus for single-line connection includes a determining module and a switching module. The determining module is configured to determine whether to establish a single-line connection with a wireless earphone, where a power supply contact of the charging box is connected to a charging contact of the wireless earphone. The switching module is configured to switch the power supply contact from a charging mode to a communication mode when determining to establish a single-line connection with the wireless earphone.

A headset box is further provided according to the present disclosure. The headset box includes two power supply contacts, a communication interface, a memory and a processor. The memory is configured to store a computer program. The processor is configured to execute the computer program to perform the method for establishing a single-line connection according to any one of the above.

The method for establishing a single-line connection according to the present disclosure includes: determining, by a wireless earphone, whether a power supply contact of a charging box is in a communication mode, where a charging contact of the wireless earphone is connected to the power supply contact of the charging box; and switching the charging contact from a charging mode to a communication mode to establish a single-line connection with the charging box, in a case that the power supply contact of the charging box is determined as in the communication mode.

It can be seen that in the present disclosure, the single-line connection between the wireless earphone and the charging box is established based on connection between the charging contact of the wireless earphone and the power supply contact of the charging box, so that the wireless earphone can exchange information with the charging box through the single-line connection, thereby improving reliability of the communication between the wireless earphone and the charging box, and enhancing the user experience. In addition, an apparatus for establishing a single-line connection, a wireless earphone, a TWS headset and a charging box are also provided according to the present disclosure, which also have the aforementioned technical effects.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter, so that objects, technical solutions and advantages of the embodiments of the present disclosure become clear. It is apparent that the described embodiments are only some rather than all embodiments of the present disclosure. All other embodiments obtained by those skilled in the art based on the embodiments of the present disclosure without any creative work fall within the protection scope of the present disclosure.

Figure 1:
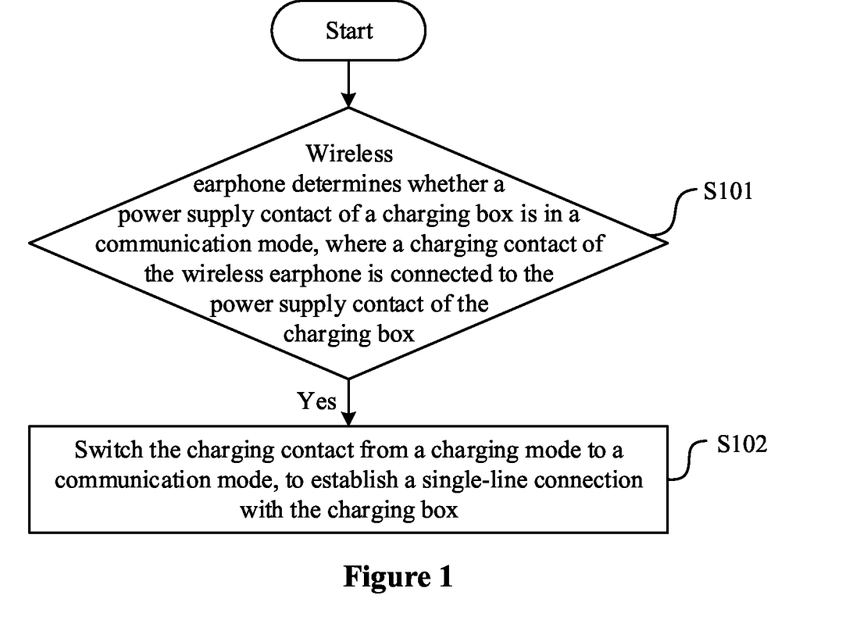
FIG. 1 is a flow chart of a method for establishing a single-line connection according to an embodiment of the present disclosure.

Reference is made to FIG. 1, which is a flow chart of a method for establishing a single-line connection according to an embodiment of the present disclosure. The method for establishing a single-line connection includes the following steps 101 and 102.

In step 101, a wireless earphone determines whether a power supply contact of a charging box is in a communication mode. The method proceeds to step 102 when the wireless earphone determines that the power supply contact of the charging box is in the communication mode. A charging contact of the wireless earphone is connected to the power supply contact of the charging box.

It should be noted that, the power supply contact of the charging box and the charging contact of the wireless earphone may each operate in a charging mode and a communication mode in this step. That is, in a case that the power supply contact and the charging contact are each in the charging mode, the charging box may quickly charge the wireless earphone. In a case that the power supply contact and the charging contact are each in the communication mode, the charging box may establish a single-line connection for information interaction with the wireless earphone.

In the case that the power supply contact of the charging box and the charging contact of the wireless earphone are each in the charging mode, a manner in which the charging box charges the charging contact may be set by designers, and is not limited herein. For example, a battery in the charging box may charge the wireless earphone. Alternatively, a power source connected to the charging box may charge the wireless earphone.

Accordingly, in the case that the power supply contact of the charging box and the charging contact of the wireless earphone are each in the communication mode, the charging box may establish the single-line connection for information interaction with the wireless earphone merely, or may establish the single-line connection for information interaction with the wireless earphone while charging the wireless earphone slowly. That is, in a case that the power supply contact is in the charging mode and the charging contact is in the communication mode, the charging box may charge the wireless earphone slowly. This embodiment is not limited thereto.

In this step, the power supply contact of the charging box and the charging contact of the wireless earphone may be contacts via which the wireless earphone is connected to the charging box when the wireless earphone is put into the charging box for charging. Structures and settings of the power supply contact of the charging box and the charging contact of the wireless earphone may be set by the designers based on practical scenarios and user requirements, and are not limited herein, as long as the charging box can establish the single-line connection for information interaction with the wireless earphone and charge the wireless earphone by connecting the power supply contact to the charging contact. For example, the power supply contact and the charging contact may each include two pins.

It should be understood that, in this step, the wireless earphone may determine whether the power supply contact of the charging box is in the communication mode, so as to determine whether to establish a single-line connection with the charging box. A manner in which the wireless earphone determines whether the power supply contact of the charging box is in the communication mode may be set by the designers. For example, since a value of the voltage of the charging contact of the wireless earphone when the power supply contact of the charging box is in the charging mode is not equal to a value of the voltage of the charging contact of the wireless earphone when the power supply contact of the charging box is in the communication mode, the wireless earphone may determine whether the power supply contact of the charging box is in the communication mode by determining whether the voltage of the charging contact of the wireless earphone is within a preset range. The manner is not limited herein, as long as the wireless earphone can determine whether the power supply contact of the charging box is in the communication mode.

In step 102, the wireless earphone switches the charging contact from a charging mode to a communication mode, to establish a single-line connection with the charging box.

It should be noted that in this step, when determining that the power supply contact of the charging box is in the communication mode, that is, when determining to establish a single-line connection with the charging box, the wireless earphone switches the charging contact from the charging mode to the communication mode. A manner in which the wireless earphone switches the charging contact from the charging mode to the communication mode may be set by the designers based on practical scenarios, and is not limited herein, as long as the wireless earphone can establish the single-line connection for information interaction with the charging box based on connection between the charging contact and the power supply contact of the charging box.

It should be understood that, in this embodiment, conflicts of broadcasting and scanning in the BLE communication between the existing wireless earphone and the charging box can be avoided by establishing the single-line connection between the wireless earphone and the charging box. Therefore, after the wireless earphone establishes the single-line connection with the charging box, that is, after the power supply contact of the charging box and the charging contact of the wireless earphone are each switched to the communication mode, data transmission between the wireless earphone and the charging box may be performed directly through the single-line connection. Since a speed of data transmission through the single-line connection is low, the wireless earphone may send status information with a small amount of data, such as power information and pairing information, to the charging box through the single-line connection. To improve the speed of data transmission between the wireless earphone and the charging box, a sequence of broadcasting and scanning in BLE communication between the wireless earphone and the charging box may be determined based on the single-line connection, so as to perform data transmission through the BLE communication between the wireless earphone and the charging box. That is, the wireless earphone may exchange information with the charging box through the single-line connection and the BLE communication. A manner in which the wireless earphone exchanges information with the charging box after establishing the single-line connection may be set by the designers, and is not limited herein.

In order to reduce a time period for information interaction between the wireless earphone and the charging box through the single-line connection and the BLE communication, the wireless earphone may start BLE scanning directly, to receive data sent by the charging box through BLE broadcasting, after determining that the power supply contact of the charging box is in the communication mode.

That is, when determining to exchange information with the wireless earphone, the charging box not only switches the power supply contact from the charging mode to the communication mode but also starts BLE broadcasting to send data to the wireless earphone, so as to avoid a step in which the charging box instructs the wireless earphone to start the BLE scanning after the single-line connection is established, thereby reducing the time period for information interaction between the wireless earphone and the charging box. The above process is not limited herein.

In this embodiment, the single-line connection between the wireless earphone and the charging box is established based on connection between the charging contact of the wireless earphone and the power supply contact of the charging box, so that the wireless earphone can exchange information with the charging box through the single-line connection, thereby improving reliability of the communication between the wireless earphone and the charging box, and enhancing the user experience.

Figure 2:
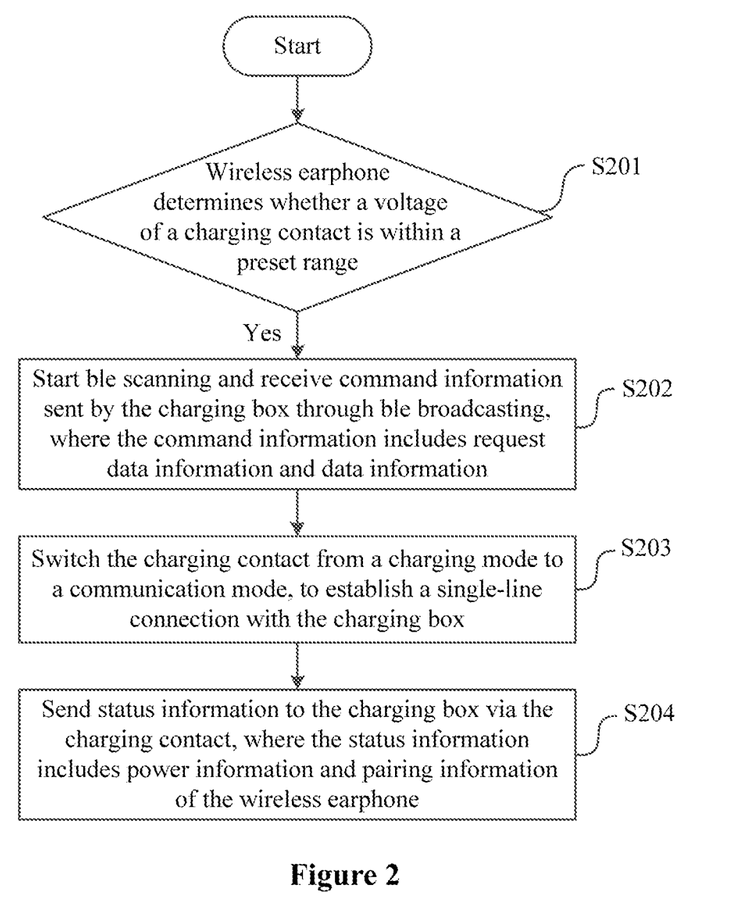
FIG. 2 is a flow chart of a method for establishing a single-line connection according to another embodiment of the present disclosure.

Reference is made to FIG. 2, which is a flow chart of a method for establishing a single-line connection according to another embodiment of the present disclosure. The method for establishing a single-line connection includes following steps 201 to 204.

In step 201, a wireless earphone determines whether a voltage of a charging contact of the wireless earphone is within a preset range. The method proceeds to step 202 when the wireless earphone determines that the voltage of the charging contact of the wireless earphone is within the preset range.

In this embodiment, the charging contact of the wireless earphone is connected to a power supply contact of a charging box. The value of the voltage of the charging contact of the wireless earphone when the power supply contact of the charging box is in the charging mode is not equal to the value of the voltage of the charging contact of the wireless earphone when the power supply contact of the charging box is in the communication mode. Therefore, the preset range in this step may be a preset range of the voltage of the charging contact of the wireless earphone when the power supply contact of the charging box is in the communication mode. In this step, the wireless earphone may determine whether the power supply contact of the charging box is in the communication mode by determining whether the voltage of the charging contact is within the preset range, so as to determine whether the charging box wants to perform data interaction with the wireless earphone. The preset range may be set by the designers, and is not limited herein.

It should be noted that, in a case that the wireless earphone determines that the voltage of the charging contact is not within the preset range, the charging contact remains in the charging mode for charging.

In step 202, the wireless earphone starts BLE scanning and receives command information sent by the charging box through BLE broadcasting. The command information includes request data information and data information.

It should be noted that in this step, the wireless earphone may start BLE scanning and receive the command information sent by the charging box through BLE broadcasting after determining that the charging box wants to perform data interaction with the wireless earphone. That is, when determining to exchange information with the wireless earphone, the charging box instructs the wireless earphone by switching the power supply to the communication mode, and sends to-be-sent data and/or information corresponding to to-be-requested data to the wireless earphone through BLE broadcasting.

The request data information in the command information may be information corresponding to data that the charging box wants to receive from the wireless earphone. The data information in the command information may be data that the charging box wants to send to the wireless earphone.

It should be noted that if the received command information includes the request data information, the wireless earphone may, based on the request data information, send a BLE scanning command to the charging box via the charging contact, and send data corresponding to the request data information to the charging box through BLE broadcasting. That is, the wireless earphone may instruct the charging box to perform BLE scanning through the single-line connection, and send the data corresponding to the request data information to the wireless earphone through BLE broadcasting. The charging box may send the request data information through BLE broadcasting as shown in this embodiment, or through a single-line connection, which is not limited herein.

In step 203, the wireless earphone switches the charging contact from a charging mode to a communication mode, to establish a single-line connection with the charging box.

It should be understood that there is no inevitable logical sequence between step 203 and step 202. The wireless earphone may start BLE broadcasting before or after switching the charging contact to the communication mode, as long as the wireless earphone can start BLE broadcasting and switch the charging contact to the communication mode after determining that the charging box wants to perform data interaction with the wireless earphone. A sequence in which steps 202 and 203 are performed is not limited herein.

In step 204, the wireless earphone sends status information to the charging box via the charging contact. The status information includes power information and pairing information of the wireless earphone.

In this step, after each single-line connection between the wireless earphone and the charging box is established, the wireless earphone sends the status information such as the power information and the pairing information of the wireless earphone to the charging box through the single-line connection, so that the charging box knows the status of the wireless earphone. Contents of the status information may be set by the designers. The status information may include the power information and the pairing information only, or may include other information, which is not limited herein.

It should be noted that when the charging contact of the wireless earphone is in the communication mode, the power supply contact of the charging box is required to be prevented from being switched to the charging mode. That is, when the single-line connection is disconnected, the charging contact of the wireless earphone is switched to the charging mode before the power supply contact of the charging box is switched to the charging mode. A manner in which the wireless earphone disconnects the single-line connection with the charging box may be set by the designers based on practical scenarios and user requirements and is not limited herein, as long as the charging contact of the wireless earphone is switched to the charging mode before the power supply contact of the charging box is switched to the charging mode. For example, the wireless earphone may directly switch the charging contact to the charging mode after performing this step through the single-line connection, or after performing this step and sending the BLE scanning command through the single-line connection. Alternatively, before switching the charging contact to the charging mode, the wireless earphone may send single-line connection disconnection information to the charging box through the single-line connection to instruct the charging box to switch the power supply contact to the charging mode.

In this embodiment, the sequence of broadcasting and scanning in the BLE communication between the wireless earphone and the charging box is determined based on the single-line connection between the wireless earphone and the charging box, such that the speed of data transmission between the wireless earphone and the charging box can be improved, the conflicts of broadcasting and scanning in the BLE communication can be avoided, thereby improving the reliability of the communication between the charging box and the wireless earphone and enhancing the user experience.

Figure 3:
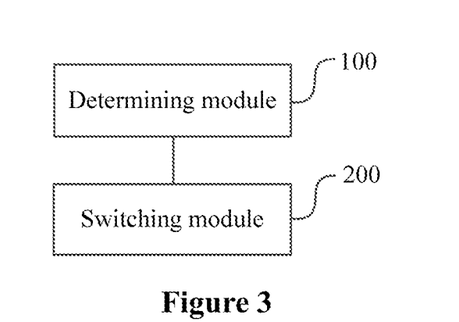
FIG. 3 is a structural diagram of an apparatus for establishing a single-line connection according to an embodiment of the present disclosure.

Reference is made to FIG. 3, which is a structural diagram of an apparatus for establishing a single-line connection according to an embodiment of the present disclosure. The apparatus for establishing a single-line connection includes a determining module 100 and a switching module 200.

The determining module 100 is configured to determine whether a power supply contact of a charging box is in a communication mode. A charging contact of a wireless earphone is connected to the power supply contact of the charging box.

The switching module 200 is configured to switch the charging contact from a charging mode to a communication mode to establish a single-line connection with the charging box, in a case that the power supply contact of the charging box is determined as in the communication mode.

Optionally, the determining module 100 may include a determining sub-module, which is configured to: determine whether a voltage of the charging contact is within a preset range; and send a start signal to the switching module 200 when determining that the voltage of the charging contact is within the preset range.

Optionally, the apparatus may further include a BLE scanning starting module, which is configured to start BLE scanning, and receive command information sent by the charging box through BLE broadcasting. The command information includes request data information and data information.

Optionally, the apparatus may further include a first sending module and a first switching module. The first sending module is configured to send single-line connection disconnection information to the charging box via the charging contact in a case that the command information is the data information. The first switching module is configured to switch the charging contact to the charging mode after the single-line connection disconnection information is sent.

Optionally, the apparatus may further include a second sending module and a second switching module. The second sending module is configured to send a BLE scanning command and a single-line connection disconnection command to the charging box via the charging contact and send data corresponding to the request data information to the charging box through BLE broadcasting, in a case that the command information is the request data information. The second switching module is configured to switch the charging contact to the charging mode after the BLE scanning command and the single-line connection disconnection command are sent.

Optionally, the apparatus may further include a third sending module and a third switching module. The third sending module is configured to send status information to the charging box via the charging contact. The status information includes power information and pairing information of the wireless earphone. The third switching module is configured to switch the charging contact to the charging mode after the status information is sent.

Optionally, the third switching module may include a sending sub-module and a switching sub-module. The sending sub-module is configured to send a single-line connection disconnection command to the charging box via the charging contact after the status information is sent. The switching sub-module is configured to switch the charging contact to the charging mode after the single-line connection disconnection command is sent.

In this embodiment, the switching module 200 switches the charging contact from the charging mode to the communication mode in a case that the power supply contact of the charging box is in the communication mode, so as to establish a single-line connection with the charging box. The single-line connection between the wireless earphone and the charging box is established based on connection between the charging contact of the wireless earphone and the power supply contact of the charging box, so that the wireless earphone can exchange information with the charging box through the single-line connection, thereby improving reliability of the communication between the wireless earphone and the charging box and enhancing the user experience.

A wireless earphone is further provided according to an embodiment of the present disclosure. The wireless earphone includes a charging contact, a communication interface, a memory and a processor. The memory is configured to store a computer program. The processor is configured to execute the computer program to perform the method for establishing a single-line connection according to any one of the above embodiments.

A TWS headset is further provided according to an embodiment of the present disclosure. The TWS headset includes a first wireless earphone and a second wireless earphone. Each of the first wireless earphone and the second wireless earphone is the wireless earphone according to the above embodiment.

Figure 4:
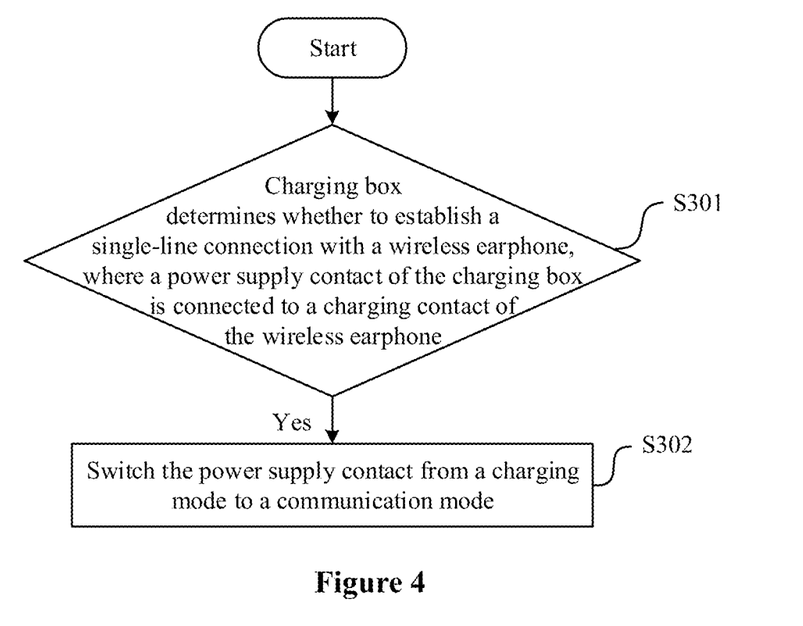
FIG. 4 is a flow chart of a method for establishing a single-line connection according to another embodiment of the present disclosure.

Reference is made to FIG. 4, which is a flow chart of a method for establishing a single-line connection according to another embodiment of the present disclosure. The method includes the following steps 301 and 302.

In step 301, a charging box determines whether to establish a single-line connection with a wireless earphone. The method proceeds to step 302 when the charging box determines to establish a single-line connection with a wireless earphone. A power supply contact of the charging box is connected to a charging contact of the wireless earphone.

It should be understood that in this step, the charging box may switch the power supply contact from a charging mode to a communication mode to establish a single-line connection with the wireless earphone when determining to exchange information with the wireless earphone, so that the wireless earphone can exchange information with the charging box through the single-line connection. In this step, a manner in which the charging box determines whether to establish a single-line connection with the wireless earphone may be set by the designers, and is not limited herein. The charging box may determine whether to establish a single-line connection with the wireless earphone by determining whether to send data and/or request data to the wireless earphone, for example, by determining whether to send command information to the wireless earphone. The command information includes request data information and data information.

In step 302, the charging box switches the power supply contact from a charging mode to a communication mode.

In this step, a manner in which the charging box switches the power supply contact connected to the charging contact of the wireless earphone from the charging mode to the communication mode may be set by the designers and is not limited herein, as long as the charging box can charge the wireless earphone in a case that the power supply contact of the charging box is in the charging mode and the charging contact of the wireless earphone is in the charging mode and the charging box can exchange information with the wireless earphone in a case that the power supply contact of the charging box is in the communication mode and the charging contact of the wireless earphone in the communication mode.

It should be noted that, the method for establishing a single-line connection according to this embodiment may be performed by a charging box to establish a single-line connection with a wireless earphone, and may correspond to the above method for establishing a single-line connection performed by a wireless earphone, and thus is not described in detail here.

It should be understood that when the charging contact of the wireless earphone is in the communication mode, the power supply contact of the charging box is required to be prevented from being switched to the charging mode. That is, when the single-line connection is disconnected, the charging contact of the wireless earphone is switched to the charging mode before the power supply contact of the charging box is switched to the charging mode. A manner in which the charging box disconnects the single-line connection established by the wireless earphone with the charging box may be set by the designers based on practical scenarios and user requirements and is not limited herein, as long as the power supply contact of the charging box is switched to the charging mode after the charging contact of the wireless earphone is switched to the charging mode. For example, the charging box may switch the power supply contact to the charging mode in response to single-line connection disconnection information sent by the wireless earphone through the single-line connection or after a preset time period after receiving single-line connection disconnection information sent by the wireless earphone through the single-line connection. Alternatively, the charging box may switch the power supply contact to the charging mode in response to a cover closing signal. That is, the charging box may switch the power supply contact to the charging mode after a cover of the charging box is closed. That is, the charging box may determine whether to exchange information with the wireless earphone in step 301 when the cover is opened, to determine whether a user wants to quickly charge the wireless earphone by determining whether the cover is opened or closed.

In this embodiment, the single-line connection between the wireless earphone and the charging box is established based on the connection between the charging contact of the wireless earphone and the power supply contact of the charging box, so that the wireless earphone can exchange information with the charging box through the single-line connection, thereby improving reliability of the communication between the wireless earphone and the charging box, and enhancing the user experience.

Figure 5:
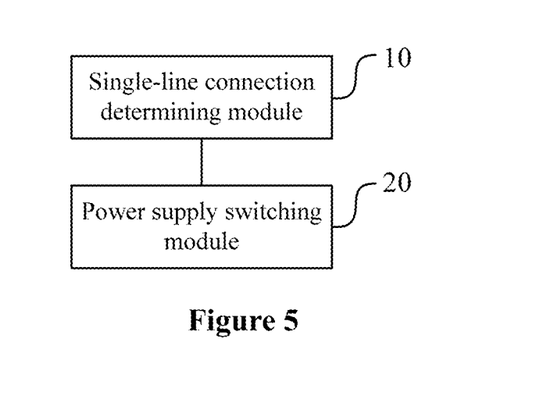
FIG. 5 is a structural diagram of an apparatus for establishing a single-line connection according to another embodiment of the present disclosure.

Reference is made to FIG. 5, which is a structural diagram of an apparatus for establishing a single-line connection according to another embodiment of the present disclosure. The apparatus includes a single-line connection determining module 10 and a power supply switching module 20.

The single-line connection determining module 10 is configured to determine whether to establish a single-line connection with a wireless earphone. A power supply contact of a charging box is connected to a charging contact of the wireless earphone.

The power supply switching module 20 is configured to switch the power supply contact from a charging mode to a communication mode when it is determined to establish a single-line connection with the wireless earphone.

Optionally, the single-line connection determining module 10 may include a command information determining sub-module, which is configured to: determine whether to send command information to the wireless earphone; and send a start signal to the power supply switching module 20 when determining to send command information to the wireless earphone. The command information includes request data information and data information.

Optionally, the apparatus may further include a command information sending module, which is configured to send the command information to the wireless earphone through BLE broadcasting.

Optionally, the apparatus may further include a status information receiving module, which is configured to receive, via the power supply contact, status information sent by the wireless earphone. The status information includes power information and pairing information of the wireless earphone.

Optionally, the apparatus may further include a first receiving module and a fourth switching module. The first receiving module is configured to receive, via the power supply contact, a BLE scanning command and a single-line connection disconnection command that are sent by the wireless earphone. The fourth switching module is configured to start BLE scanning and switch the power supply contact to the charging mode after a preset time period.

Optionally, the apparatus may further include a second receiving module and a fifth switching module. The second receiving module is configured to receive, via the power supply contact, a single-line connection disconnection command sent by the wireless earphone. The fifth switching module is configured to switch the power supply contact to the charging mode after a preset time period.

Optionally, the apparatus may further include a cover closing determining module and a sixth switching module. The cover closing determining module is configured to determine whether a cover of the charging box is closed. The sixth switching module is configured to switch the power supply contact to the charging mode when the cover closing determining module determines that the cover of the charging box is closed.

Optionally, the apparatus may further include a cover opening determining module, which is configured to determine whether a cover of the charging box is open, and send a start signal to the power supply switching module 20 when determining that the cover of the charging box is open.

In this embodiment, the power supply switching module 20 switches the power supply contact from the charging mode to the communication mode in a case that the charging box determines to establish a single-line connection with a wireless earphone. The single-line connection between the wireless earphone and the charging box is established based on the connection between the charging contact of the wireless earphone and the power supply contact of the charging box, so that the wireless earphone can exchange information with the charging box through the single-line connection, thereby improving reliability of the communication between the wireless earphone and the charging box, and enhancing the user experience.

A headset box is further provided according to an embodiment of the present disclosure. The headset box includes two power supply contacts, a communication interface, a memory and a processor. The memory is configured to store a computer program. The processor is configured to execute the computer program to perform the method for establishing a single-line connection according to the above embodiment.

The embodiments in this specification are described in a progressive way, each of which emphasizes the differences from others, and the same or similar parts among the embodiments can be referred to each other. Since the apparatus, the wireless earphone, the TWS headset and the charging box disclosed in the embodiments correspond to the methods therein, the description thereof is relatively simple, and for relevant matters references may be made to the description of the methods.

It is further understood by those skilled in the art that units and algorithm steps described in combination with the disclosed embodiments may be implemented by electronic hardware, computer software or a combination thereof. In order to clearly describe interchangeability of the hardware and the software, the units and the steps are generally described above based on functions. Whether the functions are realized by the hardware or the software is determined by specific applications of the technical solutions and design constraints. For each of the specific applications, those skilled in the art may adopt a specific implementation to realize the functions described above, and the implementation should fall within the scope of the present disclosure.

The steps of the method or algorithm according to the embodiments disclosed herein may be implemented by hardware, a software module executed by a processor or a combination of the hardware and the software module. The software module may be stored in a random access memory (RAM), a memory, a read-only memory (ROM), an electrically programmable ROM, an electrically erasable programmable ROM, a register, a hardware disk, a movable magnetic disk, a CD-ROM or any one of other storage media that are known in this technical field.

The method and the apparatus for establishing a single-line connection, the wireless earphone, the TWS headset, and the charging box according to the present disclosure are described in detail above. Specific examples are used in this specification to illustrate the principle and implementation of the present disclosure. The description of the above embodiments is only used to facilitate understanding of the method and core concept of the present disclosure. It should be pointed out that, various improvements and modifications can be made by those skilled in the art without departing from the principle of the present disclosure, and these improvements and modifications should fall within the protection scope of the present disclosure.

The invention claimed is:

1. A method for establishing a single-line connection, comprising:
   determining, by a wireless earphone, whether a power supply contact of a charging box is in a communication mode, wherein a charging contact of the wireless earphone is connected to the power supply contact of the charging box; and
   switching the charging contact from a charging mode to a communication mode to establish a single-line connection with the charging box when determining that the power supply contact of the charging box is in the communication mode, wherein the single-line connection is cut off by switching the charging contact of the wireless earphone to the charging mode before switching the power supply contact of the charging box to the charging mode.

2. The method for establishing a single-line connection according to claim 1, wherein the determining, by a wireless earphone, whether a power supply contact of a charging box is in a communication mode comprises:
   determining, by the wireless earphone, whether a voltage of the charging contact is within a preset range; and
   performing the step of switching the charging contact from a charging mode to a communication mode to establish a single-line connection with the charging box, when determining that the voltage of the charging box is within the preset range.

3. The method for establishing a single-line connection according to claim 1, wherein before the switching the charging contact from a charging mode to a communication mode to establish a single-line connection with the charging box, the method for establishing a single-line connection further comprises:
   starting Bluetooth Low Energy (BLE) scanning, and receiving command information sent by the charging box through BLE broadcasting, wherein the command information comprises request data information and data information.

4. The method for establishing a single-line connection according to claim 3, wherein after the switching the charging contact from a charging mode to a communication mode to establish a single-line connection with the charging box, the method for establishing a single-line connection further comprises:
   sending single-line connection disconnection information to the charging box via the charging contact in a case that the command information is the data information; and
   switching the charging contact to the charging mode after sending the single-line connection disconnection information.

5. The method for establishing a single-line connection according to claim 3, wherein after the switching the charging contact from a charging mode to a communication mode to establish a single-line connection with the charging box, the method for establishing a single-line connection further comprises:
   sending a BLE scanning command and a single-line connection disconnection command to the charging box via the charging contact and sending data corresponding to the request data information to the charging box through BLE broadcasting, in a case that the command information is the request data information; and
   switching the charging contact to the charging mode after sending the BLE scanning command and the single-line connection disconnection command.

6. The method for establishing a single-line connection according to claim 1, wherein after the switching the charging contact from a charging mode to a communication mode to establish a single-line connection with the charging box, the method for establishing a single-line connection further comprises:
   sending status information to the charging box via the charging contact, wherein the status information comprises power information and pairing information of the wireless earphone; and switching the charging contact to the charging mode after sending the status information.

7. The method for establishing a single-line connection according to claim 6, wherein the switching the charging contact to the charging mode after sending the status information comprises:
 sending a single-line connection disconnection command to the charging box via the charging contact after sending the status information; and
 switching the charging contact to the charging mode after sending the single-line connection disconnection command.

8. A wireless earphone, comprising:
 a charging contact;
 a communication interface;
 a memory configured to store a computer program; and
 a processor configured to execute the computer program to perform the method for establishing a single-line connection according to claim 1.

9. A true wireless stereo (TWS) headset, comprising:
 a first wireless earphone; and
 a second wireless earphone, wherein each of the first wireless earphone and the second wireless earphone is the wireless earphone according to claim 8.

10. An apparatus for establishing a single-line connection, comprising:
 a determining module configured to determine whether a power supply contact of a charging box is in a communication mode, wherein a charging contact of a wireless earphone is connected to the power supply contact of the charging box; and
 a switching module configured to switch the charging contact from a charging mode to a communication mode to establish a single-line connection with the charging box, in a case that the power supply contact of the charging box is determined as in the communication mode, wherein the single-line connection is cut off by switching the charging contact of the wireless earphone to the charging mode before switching the power supply contact of the charging box to the charging mode.

11. A method for establishing a single-line connection, comprising:
 determining, by a charging box, whether to establish a single-line connection with a wireless earphone, wherein a power supply contact of the charging box is connected to a charging contact of the wireless earphone; and
 switching the power supply contact from a charging mode to a communication mode when determining to establish a single-line connection with a wireless earphone, wherein the single-line connection is cut off by switching the charging contact of the wireless earphone to the charging mode before switching the power supply contact of the charging box to the charging mode.

12. The method for establishing a single-line connection according to claim 11, wherein the determining, by a charging box, whether to establish a single-line connection with a wireless earphone comprises:
 determining, by the charging box, whether to send command information to the wireless earphone, wherein the command information comprises request data information and data information; and
 performing the step of switching the power supply contact from a charging mode to a communication mode when determining to send command information to the wireless earphone.

13. The method for establishing a single-line connection according to claim 12, wherein after the switching the power supply contact from a charging mode to a communication mode, the method for establishing a single-line connection further comprises:
 sending the command information to the wireless earphone through BLE broadcasting.

14. The method for establishing a single-line connection according to claim 11, wherein after the switching the power supply contact from a charging mode to a communication mode, the method for establishing a single-line connection further comprises:
 receiving, via the power supply contact, status information sent by the wireless earphone, wherein the status information comprises power information and pairing information of the wireless earphone.

15. The method for establishing a single-line connection according to claim 14, wherein after the receiving status information sent by the wireless earphone, the method for establishing a single-line connection further comprises:
 determining whether a cover of the charging box is closed; and
 switching the power supply contact to a charging mode when determining that the cover of the charging box is closed.

16. A headset box, comprising:
 two power supply contacts;
 a communication interface;
 a memory configured to store a computer program; and
 a processor configured to execute the computer program to perform the method for establishing a single-line connection according to claim 11.

* * * * *